United States Patent [19]
Thurber

[11] Patent Number: 4,998,847
[45] Date of Patent: Mar. 12, 1991

[54] DRAINAGE CONDUIT WHICH IS RESISTANT TO CLOGGING BY BEAVERS

[76] Inventor: Neil J. Thurber, 3219 Coleman Road N.W., Calgary, Alberta T2L 1G6, Canada

[21] Appl. No.: 327,395

[22] Filed: Mar. 22, 1989

Related U.S. Application Data

[63] Continuation-in-part of Ser. No. 234,099, Aug. 19, 1988, abandoned.

[51] Int. Cl.⁵ ............................................. E02B 8/00
[52] U.S. Cl. ................................... 405/127; 210/164; 405/87
[58] Field of Search .................. 405/80, 83, 82, 81, 405/125, 127, 124; 210/460, 163, 164, 456, 315

[56] References Cited

U.S. PATENT DOCUMENTS

| 188,842 | 3/1877 | Beebe | 405/80 X |
|---|---|---|---|
| 337,819 | 3/1886 | Dill | 405/125 |
| 705,364 | 7/1902 | Kurtz | 210/315 X |
| 785,125 | 3/1905 | Shafer | 210/315 X |
| 1,905,919 | 4/1933 | Levis | 405/125 X |
| 3,120,491 | 2/1964 | Kincaid | 210/463 X |
| 4,662,782 | 5/1987 | Lambert | 405/127 X |
| 4,797,028 | 1/1989 | Jamieson | 405/127 X |

FOREIGN PATENT DOCUMENTS

| 107291 | 9/1907 | Canada . |
|---|---|---|
| 242532 | 8/1924 | Canada . |
| 407376 | 9/1942 | Canada . |
| 457457 | 6/1949 | Canada . |
| 737136 | 6/1966 | Canada . |
| 1195129 | 10/1985 | Canada . |

*Primary Examiner*—Dennis L. Taylor
*Attorney, Agent, or Firm*—Cushman, Darby & Cushman

[57] ABSTRACT

This invention is a device to prevent beavers (*Castor fiber* or *Castor canadensis*) from building dams or obstructions in or at the entrance to manmade structures for the flow of water, thus preventing the flow of water through such structures to the detriment of such manmade structures, adjacent or nearby structures and to the detriment of land, trees and agricultural crops upstream of the first said manmade structure. This device may also be utilized to limit the water level, or depth of water, in pools in water caused by beaver dams restricting water flow in water drainage channels. This device is not normally harmful to beavers.

12 Claims, 1 Drawing Sheet

10

DRAINAGE CONDUIT WHICH IS RESISTANT TO CLOGGING BY BEAVERS

This application is a continuation-in-part of application Ser. No. 234,099, filed Aug. 19, 1988, now abandoned.

BACKGROUND OF THE INVENTION

The construction of dams or obstructions in water flow channels by beavers causes undesirable restriction of water flow, flooding of land, damage to roadways, and loss of timber, trees and other "dry land" plants in the flooded areas. Considerable expense is incurred in the removal of beaver dams or obstructions, the trapping and relocation of beavers, and the killing of beavers to prevent the undesirable flooding and damage to various crops, roadways and manmade structures.

Beavers dam creeks or flowing water sources to (1) provide themselves with a home, (2) provide a supply route to vegetation which is their food supply, and (3) to provide a place to store a food supply for periods of time when fresh food is not available to them (i.e.: winter time, dry seasons). Beavers however are not normally apparently satisfied with the minimum amount of water which they require—they continue to dam up or stop the flow of any flowing water in the vicinity of their chosen location as much as possible. With the development of land useage (i.e.: agriculture, roads, railways, etc.) by the human race, beavers have caused problems to the human race—their dams have flooded land under cultivation, timber land, and various types of manmade structures.

Since the early construction of roads in North America, beavers have found that by plugging or damming culverts and bridges, or any conduit placed in roads to allow water to flow under the road, very little work is required to build large bodies of water. Such plugging must be removed regularly (or prevented) to prevent damage to the roadway either by washout water flowing over it or by damage to the structure or the structure footing due to water saturation.

It has been discovered that the placement of a screen device at the upstream end of a culvert or conduit will prevent beavers from constructing their dam in the inner portion of the conduit. Bed springs have been used for this purpose as well as various types of screen material, varying from screens with very small openings in it to screens with openings as large as 4 inches. Beavers however have usually used such devices to their advantage, either covering them in the process of building a dam or utilizing such screens, etc as reinforcement or a "backstop" for their dam.

A modification of the screen and bedspring concept was the construction (or fabrication) of "gates" or "grills" which provided relatively larger flow area for the water and less material to reinforce or backstop the dams the beaver constructed. Many of these gates or grills are made of rods spaced 4" to 6" apart, usually running vertically, with few horizontal rods or bars in the structure. Beavers, however, still build dams against these structures, stopping the flow of water.

Attempts have been made to prevent beavers from plugging culverts by the use of cones, semi conical grates, and short cylindrical screens of various construction—all of which prevent plugging within the culvert but do not prevent the Beaver using them to construct dams on. Other devices such as bars welded to chains, placed over the upstream end of the culvert also prevent plugging within the culvert, but require frequent maintenance to maintain water flow.

A further effort to prevent beavers from plugging culverts or conduits used for water flow has been extension of the conduit into the water channel away from the structure (road, dam, etc.) and the termination of the conduit or culvert in either a 90° elbow faced upward or downward (if depth permitted), or in a "lazy" "T" shape with openings for water flow at the top and bottom of the water source, and the stem of the "T" being the conduit. These have met with some success; however if plugged either intentionally or inadvertently by beavers or by natural causes (floods, dead floating material, etc.) they have been found to be very difficult to clean and repair. Beavers appear to intentionally plug both types of conduit extensions.

Attempts have been made to extend long (up to 50 feet) sections of conduit into waters to be kept flowing and drill numerous holes to allow water flow. Beavers, however, appear to plug these in a reasonably short time.

SUMMARY OF THE INVENTION

This invention is concerned with providing a means of allowing the flow of water but preventing the obstruction of the water flow by beavers by the erection of (beaver) dams or obstructions in or at the entrance to culverts, conduits, canals, or bridges. This invention may also be used to manage or limit the normal depth of water, or normal water level in pools of water upstream of existing beaver dams. This invention is not physically harmful to beavers.

According to the present invention, in one aspect, there is provided, in combination with a conduit for water flow via a watercourse through a man-made structure, a device to prevent obstruction of said conduit by beavers, said device being an elongated element attached to or secured in close proximity to, the upstream end of said conduit and projecting upstream thereof, said elongated element being constructed of a mesh or screen material, and being of a size sufficient to fit the opening of said upstream end of said conduit, the upstream end of said elongated element being closed by a mesh or screen element, the mesh or screen openings being of sufficient size to allow normal flow of water therethrough. Preferably the device is generally cylindrical in shape, the diameter of the cylinder being similar to that of the conduit, and the cylindrical device being coaxial with said conduit.

According to the present invention, in another aspect, there is provided a device as described in the immediately preceding paragraph, but being further characterized in that at least a portion of said elongated cylindrical element is overlaid with an inverted U-shaped element of mesh or screen material, the ends of the legs of which rest on the bed of said watercourse immediately adjacent the upstream end of said conduit.

According to still another embodiment of this invention there is provided, in combination with a beaver dam in a water-course, upstream of which beaver dam is a pool or pond of water, and within which dam is placed a conduit for water flow therethrough, a restricting device to prevent obstruction of said conduit by beavers, said device being an elongated element attached to the upstream end of said conduit and projecting upstream thereof, said elongated element being constructed of a mesh or screen material and being of a size sufficient to fit the upstream end of said conduit, the end of said elongated element being closed by a mesh or screen element, the mesh or screen openings being of sufficient size to allow normal flow of water therethrough, said device being secured to said beaver dam and said conduit by suitable means, said device and said conduit being so positioned in said beaver dam as to permit a Predetermined amount of water flow therethrough, thereby to maintain a predetermined desired water level in said pool or pond.

According to yet another embodiment of the present invention there is provided a method of protecting a man-made structure through which water flows via a conduit, from the effects of flooding due to obstruction of said conduit by beavers, said method comprising; attaching to, or securing in close proximity to the upstream end of said conduit, an elongated device of mesh or screen material, of a size sufficient to fit the opening of said upstream end of said conduit, said elongated device projecting upstream from said conduit, the upstream end of said elongated device being closed by a mesh or screen element, the mesh or screen openings being of sufficient size to allow normal flow of water therethrough.

According to a further embodiment of the present invention there is provided a method of maintaining a predetermined desired level of water in a pool or pond upstream of a beaver dam in a stream or water-course, which comprises:

placing in said beaver dam a conduit for the flow of water, at a position predetermined to permit water flow through said dam sufficient to maintain said desired level of water in said pool or pond, attaching to the upstream end of said conduit an elongated device constructed of mesh or screen material and of a size sufficient to fit the opening of said upstream end of said conduit, such that said elongated element projects upstream from said conduit, the elongated element being closed at its upstream end by a mesh or screen element, said mesh or screen openings being of sufficient size to allow normal flow of water therethrough; and securing said elongated device to said beaver dam and said conduit by suitable means.

DESCRIPTION OF THE INVENTION

Figure 1:
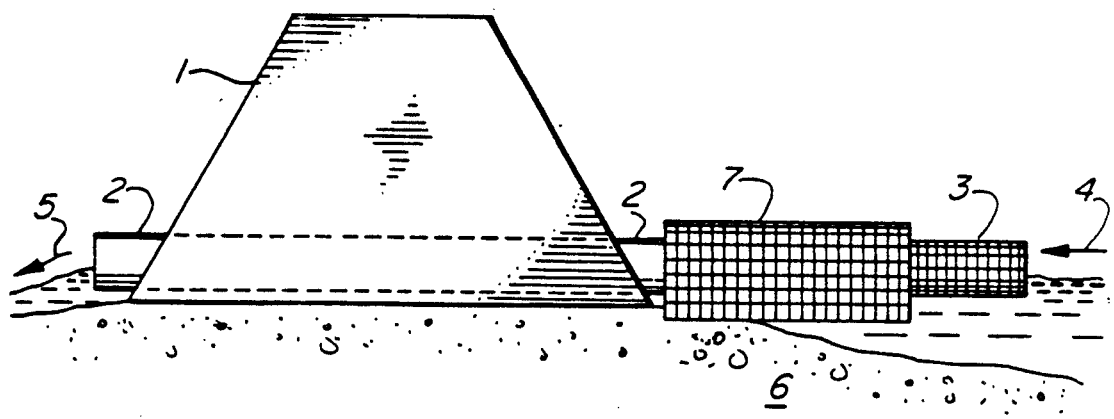
FIG. 1 is a schematic illustration, in side view, showing the placement of the device according to one embodiment of the present invention at the upstream end of a culvert or other conduit.

The device which prevents obstruction of culverts or conduits is constructed of punched, woven, welded, moulded or otherwise constructed material capable of allowing an ample volume of water and small debris to pass through it, but to not allow beavers to normally form or place material thereon to create an obstruction to the flow of water through the device. The device is placed in close proximity to, attached to, or fitted to the upstream end of the culvert, conduit, canal or bridge through which water flows.

The device is constructed of suitable material which may be punched, woven, welded, moulded or otherwise constructed mesh or screen with openings of various sizes from 3 inches to 24 inches, preferably 6 inches to 12 inches in diameter, length, or width, with a minimum of solid material between the openings, preferably less than eight percent (8%) of the total surface area of the mesh. This material is suitably formed to allow normal flow of water (and small debris) through it, but to provide a large area which must be obstructed to impede the flow of water. The installation of a second suitably formed section of the material, in certain cases, where conditions allow and warrant, spaced 6 inches to 12 inches from the first portion of the device provides a further impediment to the plugging of the device by beavers.

For use to protect culverts or conduits from obstruction the material is formed in cylindrical form of a diameter similar to that of the culvert or conduit to be protected, but preferably not less than 24 inches in diameter. One end of the cylinder thus formed is closed using a suitable material, preferably the same mesh or screen as the cylinder is constructed of. The length of the cylinder may be varied as may be appropriate to the particular installation, with lengths of 10 feet to 25 feet being usually adequate. The open end of the device is then placed in close proximity to, attached to or fitted to the upstream end of the culvert or conduit to be protected. An inverted "U" shaped element of similar material of appropriate shape and size to rest on the bottom of the water course bed and to maintain a separation of 6 inches to 12 inches from the cylindrical device may be placed and appropriately secured over a portion or all of the cylindrically shaped material to provide an area for flow into which beavers will not enter to attempt to impede water flow.

Similarly constructed devices, but constructed in cylindrical, wedge, pyrimidal or other shapes as may be appropriate to fit the upstream openings of bridges, canals, ditches, or other water flow channels, may be constructed and placed at, attached to or made part of the upstream entrance to such structures to prevent beavers from obstructing such structures.

This invention may also be used to manage or control the normal depth of water or water level in pools or ponds upstream of an existing beaver dam (at normal water flow conditions) by connecting the device or constructing the device as part of a suitable conduit, culvert or channel to be placed and secured on or in the existing dam, the bottom of which conduit, culvert or channel is placed at or to maintain the desired water level in the pool or pond, the device to be suspended or supported at the upstream side of the said beaver dam.

The upstream end of devices installed in many instances may require support and/or stabilization by various means.

Referring now to the drawings, FIG. 1 shows, schematically, a man-made structure 1 such as a road, railroad or dam which is provided with a culvert or other conduit 2 to allow the flow of water therethrough. Attached to or in close proximity with the upstream end of culvert or conduit 2 is an elongated generally cylindrical restricting device 3 constructed of any suitable mesh or screen material. The diameter of cylindrical restricting device 3 is similar to that of culvert of conduit 2, and device 3 is coaxial therewith. Numeral 4 signifies water flowing via a stream or comparable watercourse into restricting device 3 and then on through culvert 2 and continuing downstream of the culvert, as signified by numeral 5. Water flow is indicated by arrows. 6 indicates the bed of the stream or watercourse.

Figure 2:
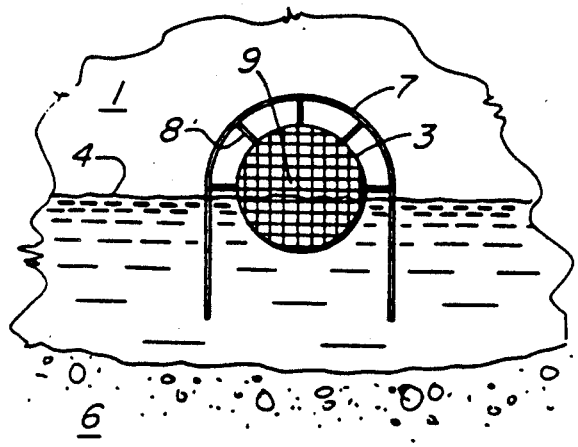
FIG. 2 is a schematic end view illustration of the device of this invention positioned at the upstream end of a culvert or other conduit.

One end of restricting device 3 is closed as shown in FIG. 2 at 9, using a suitable mesh or screen material, preferably the same mesh or screen material as that used for device 3.

In a preferred embodiment of the invention an inverted U-shaped element or device 7 the end of the legs of which rest on stream bed 6, is placed over at least a portion of restricting element 3, as illustrated. U-shaped element 7 is of a size such that there is a predetermined distance a separating restricting device 3 from the bight portion of said U-shaped element 7, as shown in FIG. 2. Distance a may be any suitable predetermined distance, but is preferably from 6 to 12 inches. The separation of U-shaped element 7 from device 3 may be maintained by any appropriate means, such as by ties or braces 8 positioned between element 7 and device 3, as illustrated in FIG. 2. U-shaped element 7 is constructed of any suitable mesh or screen material, and preferably is made of the same material as that used for restricting device 3.

Figure 3:
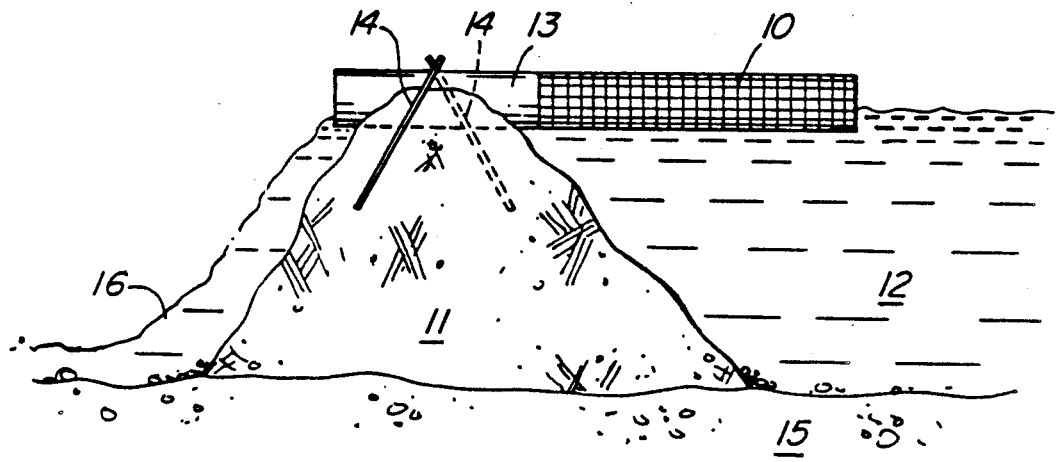
FIG. 3 is a schematic illustration of another aspect of the present invention, showing the use of the device of the present invention for limiting the depth of water above a beaver dam.

According to a further embodiment of the invention, as illustrated in FIG. 3, an elongated generally cylindrical restricting device 10 which is constructed in the same way and of the same materials as device 3 previously described, is placed on or in an existing beaver dam 11. Restricting device 10, in this embodiment of the invention, is secured to the upstream end of a conduit, culvert or channel 13 positioned in beaver dam 11 so as to maintain a predetermined desired water level in the pool or pond 12 upstream of the beaver dam. Device 10, and conduit 13, are maintained in position within the beaver dam by suitable securing means such as anchors or stakes 14. The device 10, together with conduit 13, allows a flow of water through the beaver dam sufficient to maintain the level of water in pool 12 upstream of the beaver dam at a predetermined level. In FIG. 3, 15 denotes the bed of pool or pond 12 upstream of beaver dam 11. The stream of water flowing downstream of dam 11 is shown in FIG. 3 as 16.

The "restricting device" of the present invention provides:

(1) a structure which most beavers do not appear to want to touch or work on,
(2) a structure with very low impedence to water flow,
(3) A structure which beavers cannot use as a "backstop" for materials on the lower half (of the cylinder) as there is not sufficient water pressure to hold materials for building a dam against it,
(4) a structure which would require extensive work and material to plug all openings thereof,
(5) in the case of the two layered structure for culvert protection, the two layers of material form an enclosed area into which beavers do not appear to want to go - apparently it appears, and in fact may be, a "trap" for them.
(6) The overall structure will allow most small floating debris which would lodge or catch on smaller sized openings to pass through with the water flow.

The present invention, in summary, provides a very useful, cheap and efficient device which allows a larger area to be served than previous known devices, and enables considerable savings in road repairs by governments and industry.

While this invention has been described and illustrated in terms of preferred embodiments, it will be apparent to persons skilled in the art that various changes and modifications may be made without departing from the spirit and scope of the invention. Therefore, the foregoing description and accompanying drawings are to be considered as illustrative only and not as limiting the scope of the invention, which is to be defined by the claims which follow.

What is claimed is:

1. In combination with a conduit for water flow via a watercourse through a man-made structure, a device to prevent obstruction of said conduit by beavers, said device comprising:

an elongated cylindrical element having an axis and being made of a mesh or screen material which is attached to or secured in close proximity to the upstream end of said conduit, said elongated element projecting upstream of the conduit, said elongated element being of a size sufficient to fit the opening of said upstream end of said conduit, the upstream end of said elongated element being closed by a mesh or screen element, the mesh or screen having openings of sufficient size to allow normal flow of water therethrough; and an inverted U-shaped element made of said open mesh, the inverted U-shaped element having an axis and being disposed to overlay said elongated element so that the axis of the U-shaped element is substantially parallel to the axis of the elongated element and so that said U-shaped element is separated from the elongated element by a distance of approximately 6 to 12 inches.

2. The device according to claim 1, in which said elongated element has a diameter being similar to that of the conduit, and said elongated element being coaxial with said conduit.

3. A device according to claim 1 wherein there is provided brace means between said U-shaped element and said cylindrical element to maintain the separation of said U-shaped element from said cylindrical element.

4. A device according to claim 1, said device being secured to said beaver dam by anchor means.

5. A device according to claim 2 wherein the length of said cylindrical element is from 10 to 25 feet.

6. A device according to claim 2 wherein said cylindrical element has a diameter of not less than 24 inches.

7. A device according to claim 2 wherein the mesh or screen element closing the upstream end of said cylindrical element is made of the same material as that from which said cylindrical element is made.

8. A device according to claim 2 wherein said inverted U-shaped element is constructed of the same mesh or screen material as that from which said cylindrical element is made.

9. A device according to claim 2 wherein all of said cylindrical element is overlaid with said inverted U-shaped element.

10. A device according to claim 1 or claim 2 wherein said device is constructed of mesh material wherein the solid material between the openings comprises less that 8% of the total surface area of the mesh.

11. In combination with a conduit for water flow through a dam or structure constructed by beavers for the retention of water within a water course, a device to prevent obstruction of the conduit by beavers, said device comprising an elongated element having an axis and being made of a mesh or screen material which is attached to the upstream end of said conduit, said elongated mesh element projecting upstream of the conduit, said elongated element being of a size sufficient to fit the opening of said upstream end of said conduit, the upstream end of said elongated mesh element being closed by a mesh or screen element, the mesh or screen element having openings of sufficient size to allow normal flow of water therethrough, and inverted U-shaped element made of said open mesh or screen material, the inverted U-shaped element having an axis and being disposed to overlay said elongated element so that the axis of the U-shaped element is substantially parallel to the axis of the elongated mesh element and so that said U-shaped element is separated from the elongated element by a distance of approximately 6 to 12 inches.

12. A method of protecting a man-made structure through which water flows via a conduit, from the effects of flooding due to obstruction of the conduit by beavers, said method comprising:

attaching to the upstream end of said conduit an elongated, cylindrical device of mesh or screen material of a size sufficient to fit the opening of said upstream end of said conduit, said elongated device projecting upstream from said conduit, the upstream end of said elongated device being closed by a mesh or screen element, the mesh or screen openings thereof being of sufficient size to allow normal water flow therethrough, overlaying at least a portion of said elongated cylindrical element with an inverted U-shaped element of mesh or screen material, said U-shaped element having legs, placing the legs of said U-shaped element in the bed of a stream immediately adjacent to and upstream of said conduit, separating the U-shaped element from the cylindrical elongated element by a distance of approximately 6 to 12 inches.

* * * * *